Nov. 21, 1933.  B. S. TURNER  1,935,865
METHOD OF RECONSTRUCTING METAL WHEELS
Filed Aug. 6, 1931  2 Sheets-Sheet 1
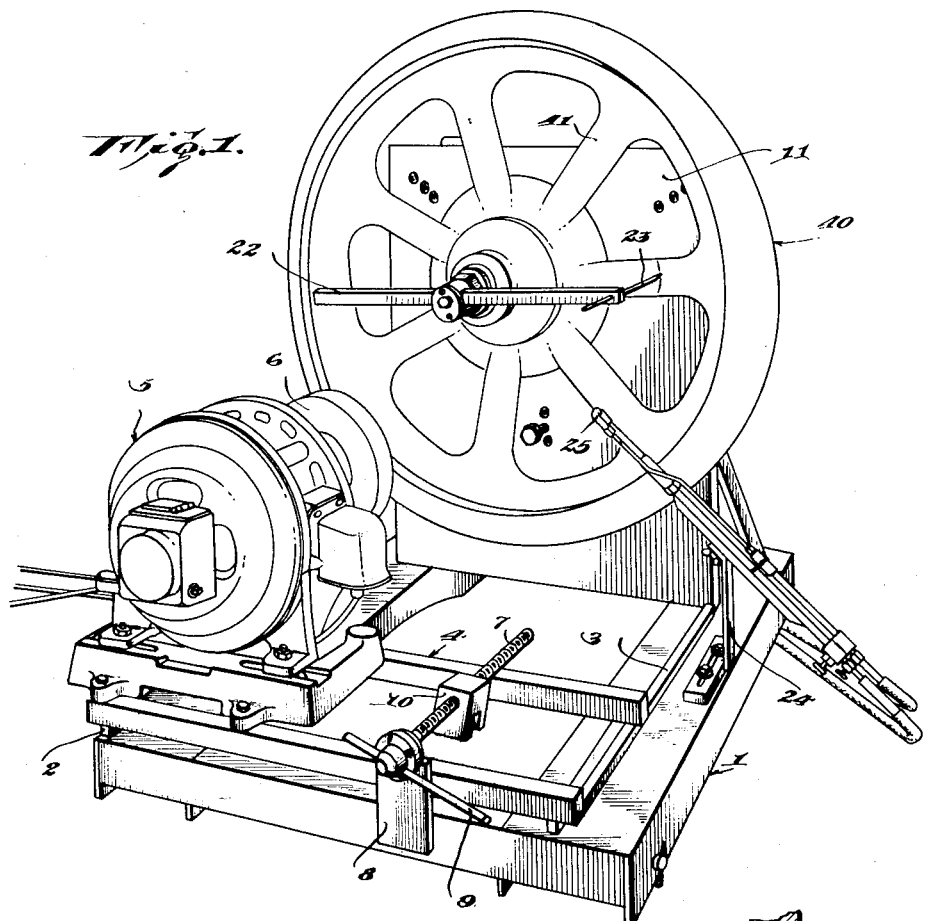
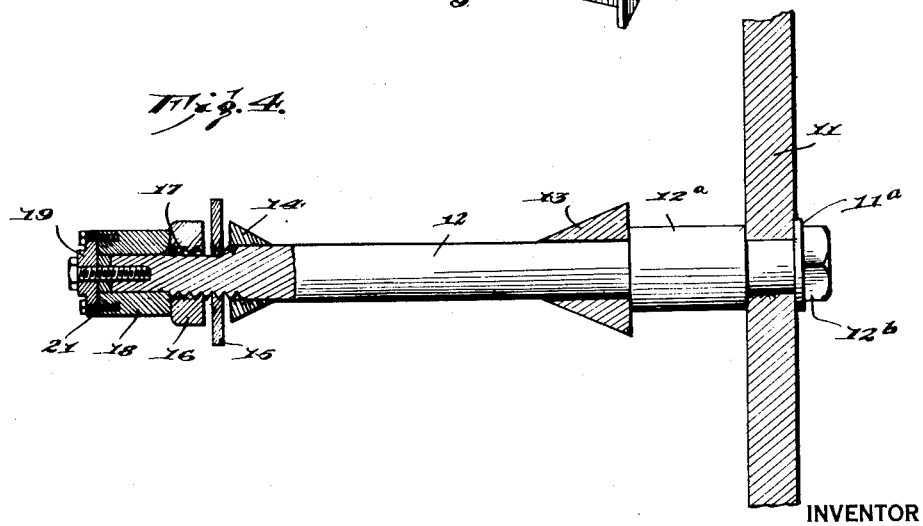
INVENTOR
Benjamin S. Turner,
BY 
ATTORNEY Nov. 21, 1933.   B. S. TURNER   1,935,865
METHOD OF RECONSTRUCTING METAL WHEELS
Filed Aug. 6, 1931   2 Sheets-Sheet 2
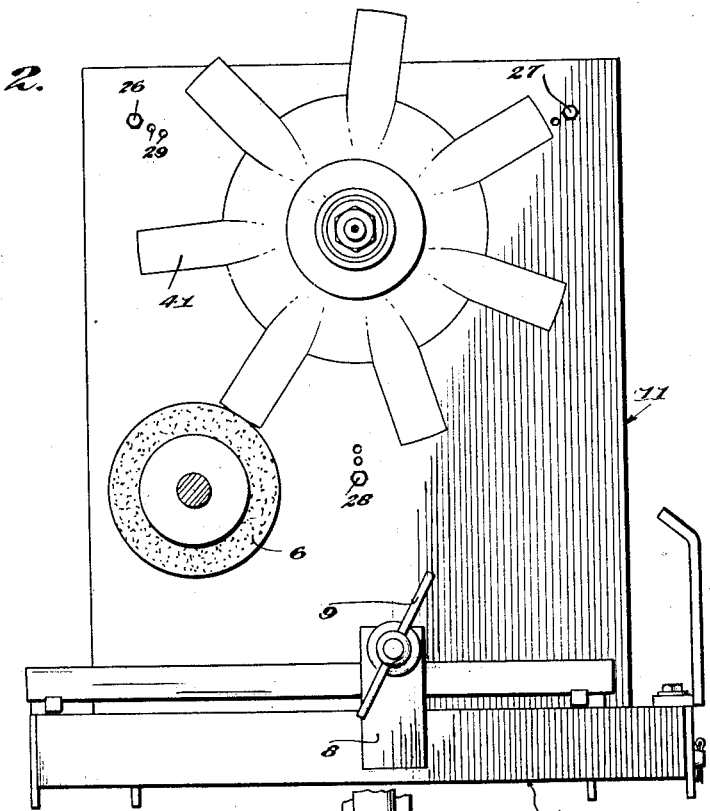
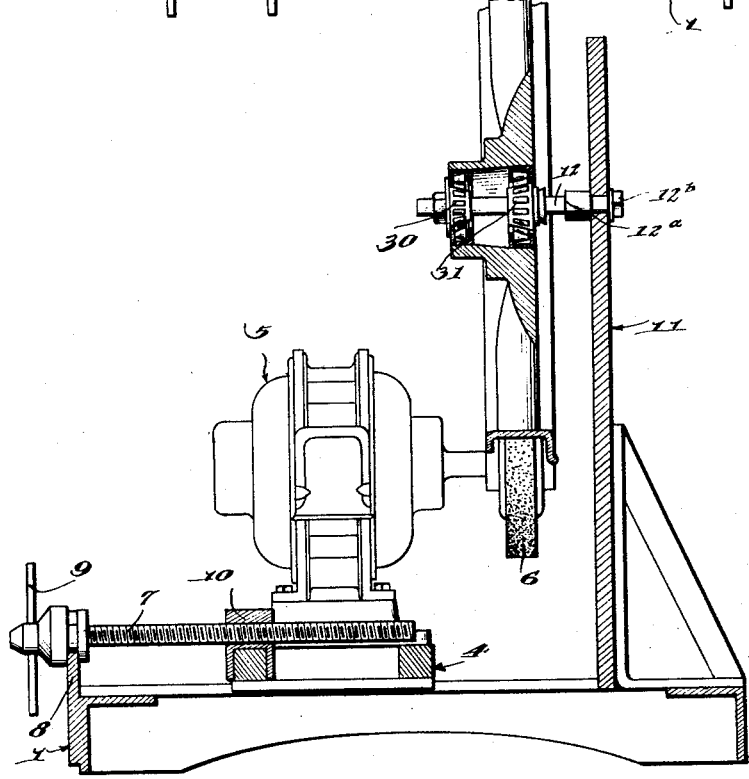
INVENTOR
Benjamin S. Turner.
BY
ATTORNEY Patented Nov. 21, 1933

1,935,865

UNITED STATES PATENT OFFICE 1,935,865

METHOD OF RECONSTRUCTING METAL WHEELS

Benjamin S. Turner, El Paso, Tex.

Application August 6, 1931. Serial No. 555,630

3 Claims. (Cl. 29—159.03)

This invention relates to a method for reconstructing metal spoke or disc wheels to change them from solid tired wheels to pneumatic tired wheels.

There are many solid tired trucks now in use which for various reasons should be changed to pneumatic tire equipment. While it is possible, of course, to buy new wheels equipped with pneumatic tires the cost is approximately 30% to 50% greater than to convert the solid tired wheels into pneumatic tired wheels.

A primary object of the invention is the provision of a method for effecting this change that an accurate wheel will be produced, that is, one which will run true when placed on its own bearings and axle.

The conversion of these solid tired wheels has been heretofore tried out by cutting the rim off with a cutting torch then putting the wheel in a lathe for truing the same up, then shrinking on the felloe band, and then removing the same from the lathe and electrically welding the spokes onto the felloe band. It has been found that while the work may be done this way it is impossible to obtain an accurate wheel by this method, that is, one that will run true when placed on its own bearings and axle, and it is to overcome these objectionable features that this invention was designed.

The method constituting this invention overcomes these difficulties by mounting the wheel to be reconstructed on suitable bearings on a shaft which accurately center the wheel and cause it to revolve exactly as it does when mounted on its own axle.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a perspective view of a machine for carrying out the method with a wheel shown applied thereto ready for removal of the solid tire;

Fig. 2 is a side elevation of a portion of the machine showing the wheel with the solid tire cut off and the spokes in the operation and having their ends ground;

Fig. 3 is a vertical section taken on the line 3—3 of Fig. 2; and

Fig. 4 is a detail side elevation partly in section showing the means for mounting the wheel prior to the reconstruction operation.

In the embodiment illustrated a supporting platform 1 is shown on which is mounted two transversely extending tracks 2 and 3 for the travel of a carriage 4 having fixed thereto a motor 5 which carries and operates a grinding wheel 6 for a purpose presently to be described. This carriage 4 on which the motor is mounted is movable transversely of the platform 1 by means of a screw 7 which is swivelled in an upstanding bracket 8 of the platform as shown clearly in Figs. 1, 2 and 3. This screw 7 has threaded engagement with a lug or boss 10 mounted on the carriage 4 so that when the screw is rotated the carriage will be moved according to the direction in which the screw is turned. A handle 9 of any desired construction is shown for manipulating the screw.

Rising from one side of the platform 1 is an upstanding plate 11 suitably braced to withstand strains to which it will be subjected. A shaft 12 extends laterally from the front face of the plate 11 in a suitable position to support the wheel to be operated on. This shaft is mounted on the plate 11 in any suitable manner being here shown provided with an extension 12b extended through plate 11 and secured by a nut 11a. As shown the shaft 12 has an enlargement 12a at the end adjacent plate 11 which forms an abutment. Cones 13 and 14 are slidable on shaft 12 and a washer 15 is keyed to the shaft outside cone 14 and held in place by a nut 16 to provide for the application and removal of the wheel to be reconstructed. These cones accurately center the bearings of the wheel which is mounted on the shaft 12 and these bearings cause the wheel shown at 20 to revolve exactly as it does when mounted on its own axle. This constitutes an important feature of the invention. It is obvious that the bearings shown at 30 and 31 in Fig. 3 may be omitted when necessary and the cones only used. It is of course to be understood that various sized cones are provided with each machine for use in centering the wheel directly on the machine spindle 12 without the use of bearings 30 and 31.

A threaded shaft extension 17 is shown in Fig. 4 and carries the washer 15 and nut 16. This extension 17 extends beyond the nut 16 and has mounted thereon a sleeve 18 secured in place by a cap 19 having a bolt 20 extending therethrough and screwed into the portion 17. Smaller bolts 21 are shown securing this cap to the sleeve. This sleeve 18 is designed to support a measuring device in the form of a bar 22 having a pointer 23 at one end. This bar is graduated in inches and is adjustable to position the marking element 23 so that the wheel may be cut to the exact size required. This pointer 23 marks on the spokes 41 of the wheel the places in which they are to be cut. This cutting is effected by means of a cutting torch 25 which is mounted on an adjustable bracket 24 carried by the platform and by means of which the torch may be varied in its relation to the wheel. It is of course understood that after the torch has been adjusted to the desired position that it remains stationary and the wheel is revolved to bring the spokes 41 thereof opposite the torch to effect the cutting off of the rim.

In Fig. 1 the solid tire wheel 40 is shown mounted on the bearing carrying axle with the pointer 23 showing the exact location of the cut to be made and with the cutting torch in position ready to make the cut. The wheel having been revolved and the spokes cut at the points indicated, the solid tire is removed and the wheel appears as shown in Fig. 2. The carriage 4 is then adjusted in relation to the wheel to bring the grinding wheel 6 directly beneath the ends of the spokes 41 and the rough ends of the spokes are ground off to the exact diameter desired. This diameter is ascertained by caliphering inside of the steel felloe band which is to be applied to the spokes 41 to complete the reconstructed wheel, and then setting the calipherer pointer to this measurement.

After adjusting the depth of the cut on one spoke the others are ground off by rotating the steel wheel with the grinder remaining in the set position. After the wheel has had the spokes ground to size and the felloe band for the pneumatic tire has been placed in position, ready for welding, it will be found to be perfectly round owing to the fact that the spokes were ground in a true circle before shrinking on the felloe band. This can be verified by the pointer 23 mounted on the end of the shaft 12 and which is true with the center of the hub.

To enable the rim to be trued up so that there will be no wabbling in the wheel three studs 26, 27 and 28 are provided and arranged as shown in Fig. 2. These studs are adapted to be adjustably mounted in one of a series of apertures 29 arranged radially in relation to the wheel hub. These studs may be of any desired diameter, being preferably about seven-eighths of an inch and after the position of the felloe band has been determined by measurement the studs are screwed to the place to correspond to this measurement. Then the rim is heated slightly to expand about one-thirty-secondth of an inch and is placed over the spokes until it contacts the studs. As soon as the rim shrinks sufficiently to grip the ends of the spokes slightly two of the studs are screwed down and the wheel is revolved using the head of the remaining stud as a gauge. This is accomplished by placing one spoke at a time over the stud and after seeing that the rim is in contact with the stud the spoke is tack welded with an electric arc welder to the felloe band in this position. By using that stud as a final gauge there will be no variation from side to side. By tack welding the rim to the spoke it is impossible for the rim to get out of true and the wheel is then ready to be moved from the machine and the spokes electrically welded to the felloe band completing the job. It is of course understood that pneumatic tires may be mounted on demountable rims and placed on the wheel in the manner well understood.

The gist of the invention resides in the provision of a method in which a wheel may be prepared and a felloe band made ready for electric welding all in one apparatus and much more rapidly than has heretofore been found possible, and at a minimum cost and which is absolutely accurate. This method enables an operator to cut a wheel to closer limit than has heretofore been found possible and with a cut which is circular so that the ends of the spokes which are ground to very fine limits will be on an arc of a circle and fixed accurately within the rim to be welded thereto. This causes the wheel to run perfectly round without wabbling, the same as it does when mounted on its own axle on the road.

It is of course to be understood that if a demountable rim is not desired the rim can be welded directly to the wheel instead of the felloe band. The smooth running of the wheel without wabbling is due to the fact that the wheel is centered by mounting it on bearings during the reconstruction operation as is shown clearly in Fig. 3; or on the cones without the bearings.

The gauge 22 shown in Fig. 1 is used to show a gauge for measuring the size of the wheel to be cut but it is obvious that this gauge could be mounted in some other position to show the size to which the wheel must be cut and to gauge the cut.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. A method of converting a solid tired metal wheel into a pneumatic tired wheel which consists in mounting a wheel on a frame to revolve on its own bearings; then marking on the spokes of said wheel the point at which the spokes are to be cut; then cutting the spokes at the points indicated and grinding said cut ends, then shrinking and tack welding a felloe band to the spoke ends; and then permanently welding the band to the spokes.

2. A method of converting a solid tired metal wheel into a pneumatic tired wheel which consists in mounting a disc wheel to revolve on centering cones on the bearing surfaces, cutting the disc at the point desired, and grinding the edge thereof on the arc of a circle, tack welding a felloe band on the disc edge, and then permanently welding the band to the disc.

3. A method of converting a solid tired metal spoke or disc wheel into a pneumatic tired wheel which consists in mounting a wheel to revolve on centering cones on the bearing surfaces, revolving the wheel while cutting off a portion of the wheel inwardly of the periphery to remove the rim carrying the solid tire, grinding the cut edges thereof on the arc of a circle, shrinking a felloe band on to the ground edges of wheel, alining the ground edges so that they will be in the same plane, tack welding the felloe band on the alined edges and then permanently welding the band to the wheel.

BENJAMIN S. TURNER.